July 14, 1925.　　　　　　　　　　　　　　　1,546,206
F. E. CONNER
RIM
Filed Feb. 21, 1922　　　2 Sheets-Sheet 1

F. E. Conner
INVENTOR

BY Victor J. Evans
ATTORNEY

WITNESS:

July 14, 1925.
F. E. CONNER
RIM
Filed Feb. 21, 1922
1,546,206
2 Sheets-Sheet 2
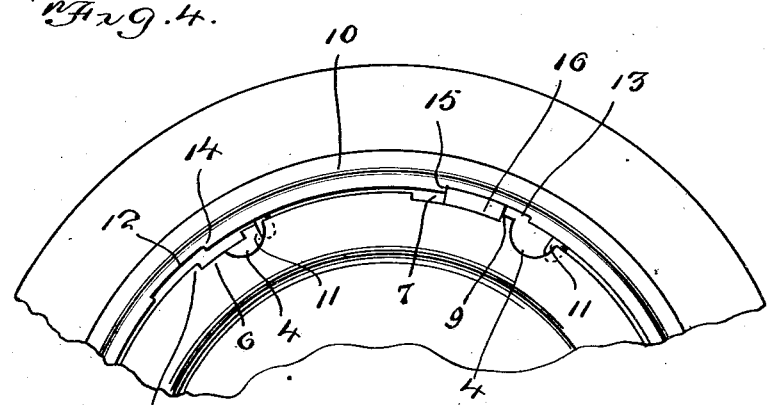
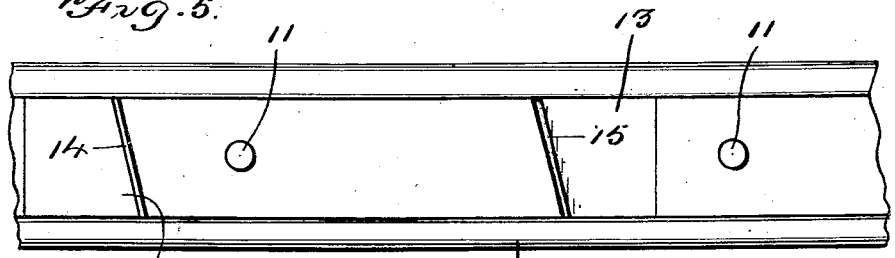
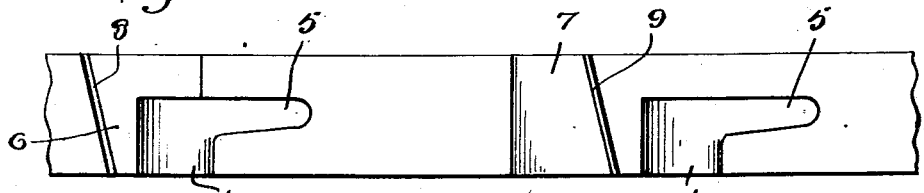
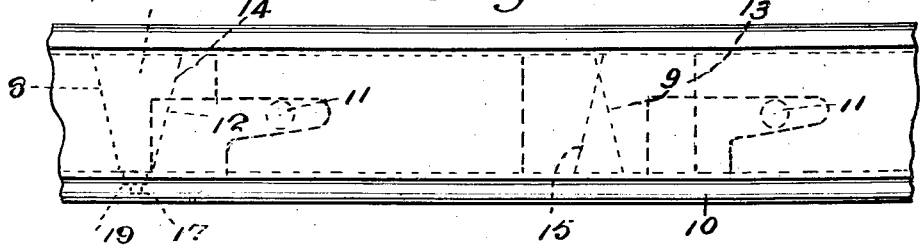
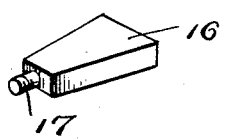
F. E. Conner
INVENTOR
BY Victor J. Evans
ATTORNEY
WITNESS:

Patented July 14, 1925.

1,546,206

UNITED STATES PATENT OFFICE.

FRANK E. CONNER, OF QUENEMO, KANSAS, ASSIGNOR OF ONE-HALF TO JAMES WESLEY WATKINS, OF QUENEMO, KANSAS.

RIM.

Application filed February 21, 1922. Serial No. 538,298.

*To all whom it may concern:*

Be it known that I, FRANK E. CONNER, a citizen of the United States, residing at Quenemo, in the county of Osage and State of Kansas, have invented new and useful Improvements in Rims, of which the following is a specification.

My present invention has reference to a wheel construction.

My object is to provide a wheel with a tire carrying rim which may be easily, quickly and effectively secured on the wheel and as readily removed therefrom.

The foregoing, and other objects which will appear as the nature of the invention is better understood, may be accomplished by a construction, combination and operative association of parts, such as is disclosed by the drawings which accompany and which form part of this specification.

In the drawings:—

Figure 4 is a fragmentary side elevation but showing the manner in which the wedge when removed from position to lock the tire carrying rim on the wheel, may be utilized for turning the tire carrying rim to bring the studs thereon out of the longitudinal passages of the key-hole slots in the periphery of the wheel.

Figure 5 is a fragmentary plan view looking toward the inner face of the tire carrying rim.

Figure 6 is a similar view looking toward the outer face of the wheel.

Figure 7 is a perspective view of the wedge member.

Figure 8 is a fragmentary plan view of the tire carrying rim arranged on the wheel.

Figure 1:
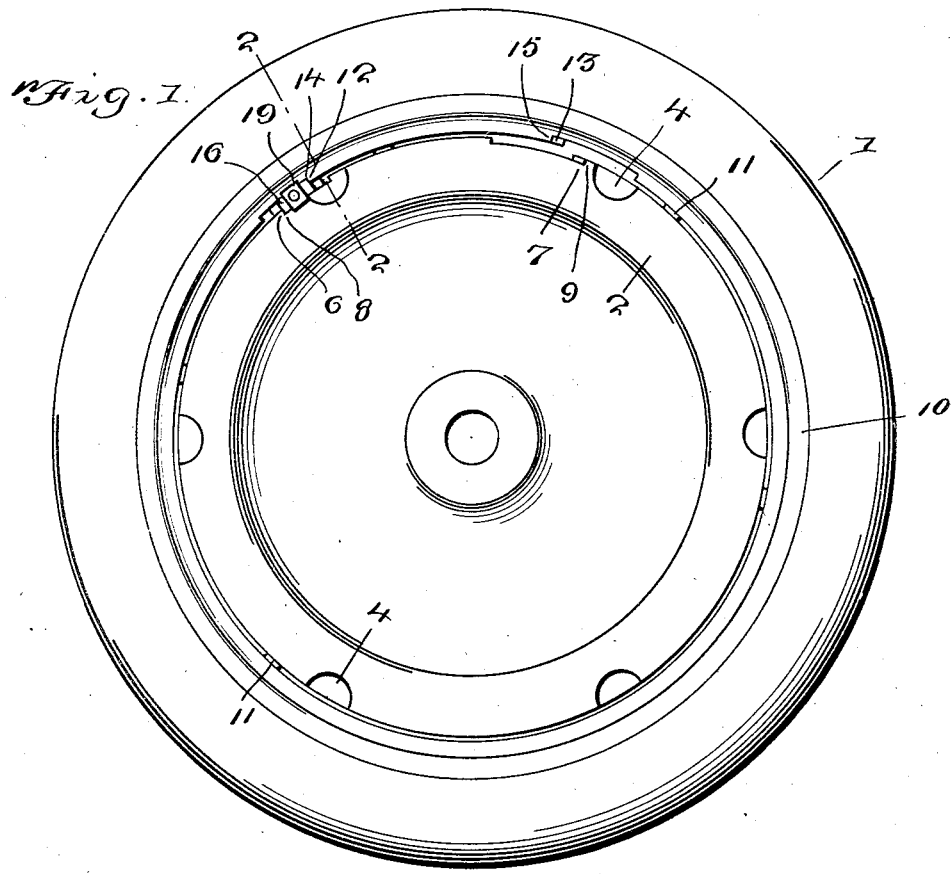
Figure 1 is a side elevation of a wheel in accordance with this invention.
Figure 2:
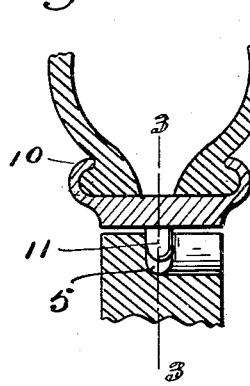
Figure 2 is an enlarged sectional view on the line 2—2 of Figure 1.
Figure 3:
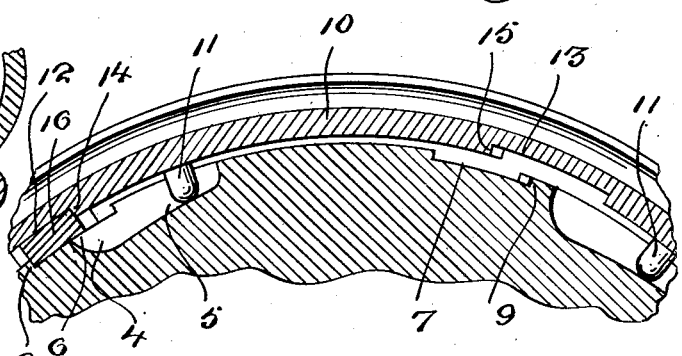
Figure 3 is a similar sectional view on the line 3—3 of Figure 2.

Referring now to the drawings in detail, the numeral 1 designates a vehicle wheel of the construction ordinarily employed on automobiles, the periphery thereof being, for distinction, indicated by the numeral 2. The periphery 2, at equi-distantly spaced intervals is provided with laterally arranged slots 4 that communicate with longitudinal slots 5, the inner walls of the said slots 5 being arranged at an angle. The periphery 2 to the opposite sides of one of the bayonet slots thus provided has peripheral transverse notches, indicated for distinction by the numerals 6 and 7, one longitudinal wall of each notch being arranged at an inclination, as indicated by the numerals 8 and 9 respectively.

The tire carrying rim is indicated by the numeral 10. The rim is of the usual construction, but has its inner peripheral face provided with spaced lugs 11, which equal in number the bayonet slots in the periphery 2 of the wheel. It will be apparent that when the tire carrying rim is arranged against the periphery of the wheel, the lugs 11 will first enter the lateral passages of the bayonet slots, permitting the tire carrying rim to be arranged centrally over the periphery of the wheel. Thereafter the tire carrying rim is moved circumferentially on the wheel to bring the lugs 11 into the longitudinal passages of the bayonet slots.

The inner peripheral face of the tire carrying rim 10 is, at points spaced from one of the lugs 11 notched transversely, as at 12 and 13 respectively. The confronting longitudinal walls provided by these notches are beveled or inclined in the same direction, as indicated by the numerals 14 and 15 respectively, and these walls are arranged at an opposite angle with respect to the walls 8 and 9 provided by the notches 6 and 7 in the periphery 2. When the tire carrying rim has been turned on the wheel, as above described, the notch 12 of the said tire carrying rim will register with the notch 6 and the notch 13 will register with the notch 7. These aligning notches provide spaced wedge-shaped pockets. To secure the tire carrying rim on the wheel, a wedge key 16 is passed through the pockets provided by the notches 6 and 12, the angle edges of the key contacting with the shoulders 8 and 14 respectively. The key has on its reduced end a threaded extension 17 on which is screwed a nut 19, whereby the key is effectively held in locked position and the tire carrying rim effectively secured on the wheel. When it is desired to remove the tire carrying rim from the wheel, the wedge key is removed from its pocket and the reduced end thereof is inserted in the pocket provided between the notches 7 and 13. As the angle walls of these notches are reversely directed with respect to the angle walls in the first mentioned pocket, it will be seen that when the wedge is forced to contact with the walls 9 and 15 respectively, the tire carrying rim will be given an initial circumferential movement on the wheel periphery 2, and upon its full insertion in the pocket, the wedge key will have so moved the tire carrying rim to bring the lugs thereof out of the longitudinal passages of the keyhole slots and in a line with the lateral passages of the said slots. When so arranged, the operator can easily slide the tire carrying rim off of the wheel.

It is thought that the foregoing description, when taken in connection with the drawings will fully set forth the construction, advantages and operation of the improvement and therefore further detailed description will not be required.

Having thus described the invention, I Having described the invention, I

A wheel and a tire carrying rim to surround the periphery of the wheel, said wheel having peripheral bayonet slots whose angle passages enter from one side of the wheel and having a pair of spaced notches whose opposite outer ends are disposed at the same inclination, said tire carrying rim having on its inner peripheral face studs to be received in the bayonet slots, the inner periphery of the said tire carrying rim being also provided with a pair of transverse notches whose inner walls are disposed at the same inclination and which are designed to be arranged over the notches in the periphery of the wheel and to define therebetween oppositely arranged wedge-shaped passages, a wedge key designed to be forced through one of said passages to contact between the angle shoulders provided thereby to impart a circumferential movement of the rim on the periphery of the wheel to force the lugs of the rim into the longitudinal passages of the bayonet slots in the periphery of the wheel, removable means for locking the wedge key when the parts are brought to such position, and said wedge key when removed, designed to be inserted into the second passage to contact between the angle shoulders provided by said passage and to force the rim in a second direction on the wheel to bring the lugs of the rim in a line with the lateral passages of the bayonet slots and to permit of the separation of the rim from the wheel.

In testimony whereof I affix my signature.

FRANK E. CONNER.